(12) United States Patent
Jung et al.

(10) Patent No.: US 10,547,196 B2
(45) Date of Patent: Jan. 28, 2020

(54) ELECTRONIC APPARATUS, CHARGE CONTROLLING METHOD, AND COMPUTER-READABLE RECORDING MEDIUM

(71) Applicant: SAMSUNG ELECTRONICS CO., LTD., Suwon-si (KR)

(72) Inventors: Ji-hoon Jung, Seoul (KR); Ki-young Kim, Yongin-si (KR); Bong-chul Kim, Seoul (KR); Sung-rok Bang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 380 days.

(21) Appl. No.: 15/215,725

(22) Filed: Jul. 21, 2016

(65) Prior Publication Data

US 2017/0104359 A1   Apr. 13, 2017

(30) Foreign Application Priority Data

Oct. 7, 2015 (KR) .......................... 10-2015-0140876

(51) Int. Cl.
| | | |
|---|---|---|
| H02J 7/00 | (2006.01) | |
| H02J 7/02 | (2016.01) | |
| H02J 7/04 | (2006.01) | |

(52) U.S. Cl.
CPC .............. H02J 7/025 (2013.01); H02J 7/045 (2013.01)

(58) Field of Classification Search
USPC ........................................................ 320/108
See application file for complete search history.

(56) References Cited

U.S. PATENT DOCUMENTS 5,382,893 A * 1/1995 Dehnel .................. H02J 7/008
                                                        307/66
6,087,810 A    7/2000 Yoshida
6,137,265 A   10/2000 Cummings et al.
(Continued)

FOREIGN PATENT DOCUMENTS

CN     103531858 A     1/2014
EP     1 416 605 A1    5/2004
(Continued)

OTHER PUBLICATIONS

Int'l Search Report for PCT/KR2016/008682 dated Nov. 11, 2016.
(Continued)

*Primary Examiner* — Arun C Williams
(74) *Attorney, Agent, or Firm* — Sughrue Mion, PLLC

(57) ABSTRACT

An electronic apparatus, a charge controlling method, and a computer-readable recording medium are provided. The electronic apparatus includes a battery unit including a battery and configured to supply power to components of the electronic apparatus using power of the battery, a charging circuit configured to, in response to the power being received from an external adapter, charge the battery using the received power, and a controller configured to detect a charging state of the battery, divide a charging process into a plurality of charging periods according to the detected charging state, and control the charging circuit to provide different target voltages to the divided charging periods and target currents determined according to the different target voltages and preset power consumption to the battery.

16 Claims, 11 Drawing Sheets

(56) References Cited

U.S. PATENT DOCUMENTS

| | | | |
|---|---|---|---|
| 8,643,342 B2 | 2/2014 | Mehta et al. | |
| 2003/0117112 A1* | 6/2003 | Chen | H02J 7/0073 320/137 |
| 2004/0195996 A1* | 10/2004 | Nishida | H02J 7/0073 320/103 |
| 2007/0188134 A1* | 8/2007 | Hussain | H01M 10/44 320/114 |
| 2007/0222416 A1 | 9/2007 | Sato | |
| 2009/0033280 A1 | 2/2009 | Choi et al. | |
| 2010/0066305 A1* | 3/2010 | Takahashi | H01M 10/44 320/108 |
| 2011/0279079 A1* | 11/2011 | Do Valle | H02J 7/0073 320/107 |
| 2013/0063079 A1* | 3/2013 | Kawai | H02J 7/045 320/107 |
| 2015/0280477 A1 | 10/2015 | Kusumoto et al. | |

FOREIGN PATENT DOCUMENTS

| | | |
|---|---|---|
| JP | 08-203563 | 8/1996 |
| JP | 10-285816 | 10/1998 |
| JP | 2000-277166 | 10/2000 |
| KR | 2003-0072734 A | 9/2003 |
| KR | 101303164 | 9/2013 |
| KR | 20140014715 | 2/2014 |

OTHER PUBLICATIONS

Written Opinion for PCT/KR2016/008682 dated Nov. 11, 2016.
Communication dated Jul. 19, 2018, issued by the European Patent Office in counterpart European Application No. 16853805.6.
Communication dated Jan. 29, 2019, issued by the European Patent Office in counterpart European Application No. 16853805.6.
Communication dated Sep. 12, 2019 issued by the European Patent Office in counterpart European Patent Application No. 16853805.6.

* cited by examiner (a)

(b)

ELECTRONIC APPARATUS, CHARGE CONTROLLING METHOD, AND COMPUTER-READABLE RECORDING MEDIUM

RELATED APPLICATION(S)

This application claims priority from Korean Patent Application No. 10-2015-0140876, filed on Oct. 7, 2015, in the Korean Intellectual Property Office, the disclosure of which is incorporated herein by reference in its entirety.

BACKGROUND

Apparatuses and methods consistent with exemplary embodiments relate to an electronic apparatus, a charge controlling method, and a computer-readable recording medium, and more particularly, to an electronic apparatus capable of reducing a charging time of a battery, a charge controlling method thereof, and a computer-readable recording medium.

In recent years, many portable electronic apparatuses with batteries have become very popular. However, the batteries are limited in capacity and need to be charged. When the portable electronic devices implement higher capacity batteries, it may take a long time to fully charge the higher capacity batteries.

SUMMARY

Exemplary embodiments are described in this disclosure, however, nothing in this disclosure should be understood as limiting all embodiments of the disclosure. While various embodiments are described, the number of embodiments described in the disclosure is necessarily limited for ease of explanation.

One or more exemplary embodiments relate to an electronic apparatus capable of reducing a charging time of a battery by varying target voltages and target currents for a plurality of charging periods to provide power to a battery with fixed power consumption, a charge controlling method thereof, and a computer-readable recording medium.

According to an aspect of an exemplary embodiment, there is provided an electronic apparatus including a battery unit including a battery and configured to supply power to components of the electronic apparatus using power of the battery; a charging circuit configured to, in response to the power being received from an external adapter, charge the battery using the received power; and a controller configured to detect a charging state of the battery, divide a charging process into a plurality of charging periods according to the detected charging state, and control the charging circuit to provide different target voltages to the divided charging periods and target currents determined according to the different target voltages and preset power consumption to the battery.

The controller may control the charging circuit to provide a first constant current to the battery until a charge voltage approaches a first target voltage corresponding to the charging state, and control the charging circuit to provide a second constant current smaller than the first constant current to the battery until the charge voltage approaches a second target voltage larger than the first target voltage in response to the first target voltage being achieved.

The controller may control the charging circuit to provide a constant voltage corresponding to a final target voltage to the battery in response to the final target voltage being achieved.

The controller may measure a battery voltage and determine the charging state of the battery based on the measured battery voltage.

The controller may control the charging circuit to provide a constant current smaller than the target currents or to receive a discharge current from the battery in an idle period between adjacent ones of the plurality of charging periods.

The idle period may include a plurality of idle sections in which different constant currents are provided.

The idle period may be more than 0 (zero) seconds and less than 60 seconds.

The controller may measure a battery voltage in the idle period.

The electronic apparatus may further include a wireless charging unit configured to receive wireless power, which may be a magnetic field transmitted by the external adapter, or external power transmitter, and charge the battery by converting the received wireless power to power having a preset level. The controller may control the wireless charging unit to provide the determined target currents to the battery.

According to an aspect of an exemplary embodiment, there is provided a charge controlling method of an electronic apparatus, the method including detecting a charging state of a battery; and dividing a charging process into a plurality of charging periods according to the detected charging state and charging the battery with target voltages different according to the divided charging periods and target currents determined according to the different target voltages and preset power consumption.

The charging may include providing a first constant current to the battery until a charge voltage approaches a first target voltage corresponding to the charging state; and providing a second constant current smaller than the first constant current to the battery until the charge voltage approaches a second target voltage larger than the first target voltage in response to the first target voltage being achieved.

The method may further include providing a constant voltage corresponding to a final target voltage to the battery in response to the final target voltage being achieved.

The detecting may include measuring a battery voltage and detecting the charging state of the battery based on the measured battery voltage.

The charging may include providing a constant current smaller than the target currents or receiving a discharge current from the battery in an idle period between adjacent ones of the plurality of charging periods.

The idle period may include a plurality of idle sections in which different constant currents are provided.

The idle period may be more than 0 (zero) seconds and less than 60 seconds.

The detecting may include measuring a battery voltage in the idle period.

The method may further include receiving wireless power, which may be magnetic energy, from an external power transmitter, or external adapter and converting the received wireless power to power having a preset level.

According to an aspect of an exemplary embodiment, there is provided a non-transitory computer-readable recording medium including a program for executing a charge controlling method of an electronic apparatus including a charging circuit, the method including detecting a charging state of a battery; and dividing a charging process into a plurality of charging periods according to the detected charging state and controlling the charging circuit to charge the battery with target voltages different according to the divided charging periods and target currents determined according to the different target voltages and preset power consumption.

The controlling may include controlling the charging circuit to provide a constant current smaller than the target currents or to receive a discharge current from the battery in an idle period between the plurality of charging periods, and the detecting may include measuring a battery voltage in the idle period.

Additional aspects and advantages of exemplary embodiments are set forth in the detailed description, and will be obvious from the detailed description, or may be learned by practicing the various exemplary embodiments.

BRIEF DESCRIPTION OF THE DRAWINGS

The above and/or other aspects of the present disclosure will be more apparent by describing certain exemplary embodiments of the present disclosure with reference to the accompanying drawings, in which.

DETAILED DESCRIPTION

Figure 1:
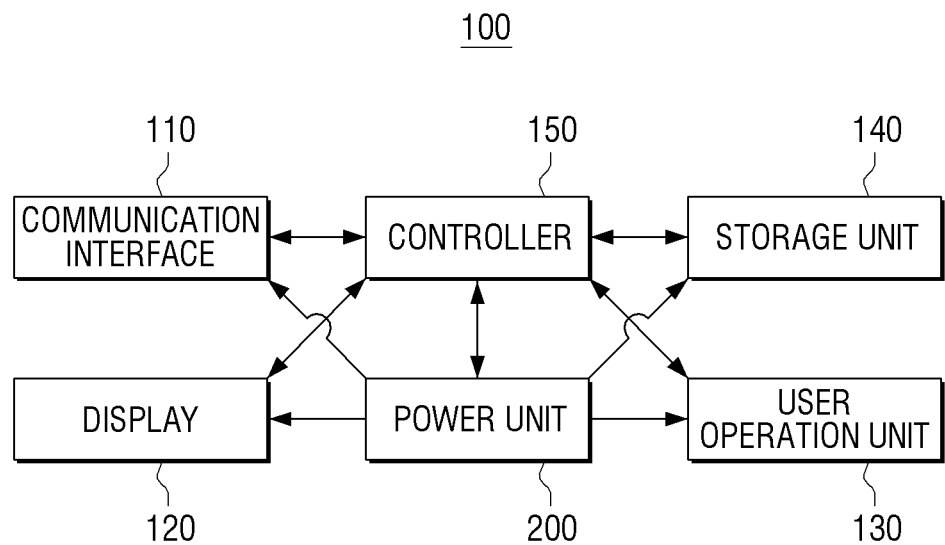
FIG. 1 is a diagram illustrating a configuration of an electronic apparatus according to an exemplary embodiment.

Various exemplary embodiments of the present disclosure may be diversely modified. Accordingly, specific exemplary embodiments are illustrated in the drawings and are described in detail. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

The terms "first", "second," etc. may be used to describe diverse components, but the components are not limited by the terms. The terms are only used to distinguish one component from the others.

The terms used in the present application are only used to describe the various exemplary embodiments, but are not intended to limit the scope of the disclosure. The singular expression also includes the plural meaning as long as the context does not suggest otherwise. In the present application, the terms "include," "have" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In exemplary embodiments of the present disclosure, a "module" or a "unit" performs at least one function or operation, and may be implemented with hardware, software, or a combination of hardware and software. In addition, a plurality of modules or units may be integrated into a fewer number of modules, and may be implemented with at least one processor.

Hereinafter, the present disclosure will be described in detail with reference to the accompanying drawings.

FIG. 1 is a block diagram illustrating an electronic apparatus according to an exemplary embodiment.

Referring to FIG. 1, an electronic apparatus 100 according to an exemplary embodiment may include a communication interface 110, a display 120, a user operation unit 130, a storage unit 140, a controller 150, and a power unit 200. The electronic apparatus 100 may be a portable television (TV), a laptop computer, a tablet, an MP3 player, a smart phone, a portable phone, a portable multimedia player (PMP), and the like, which use batteries.

The communication interface 110 may be configured to couple the electronic apparatus 100 to an external apparatus (not shown), and may be connected to the external apparatus through a local area network (LAN) and an Internet network as well as through a wireless communication such as, for example, global system for mobile communication (GSM), universal mobile telephone system (UMTS), long term evolution (LTE), wireless broadband (WiBro), and the like.

The display 120 may display various types of information provided from the electronic apparatus 100. For example, the display 120 may be implemented with devices configured to display an image such as a cathode ray tube (CRT), a liquid crystal display (LCD), an organic light emitting diode (OLED), an active matrix OLED (AMOLED). In another example, the display 120 may be implemented with a touch screen that also receives user input by touch.

The user operation unit 130 may include a plurality of function keys that the user may use to set or select various functions supported by the electronic apparatus 100. For example, the user operation unit 130 may be implemented with an input device such as a keyboard, a mouse, a touch pad, and a button. In another example, the user operation unit 130 may be implemented with a touch screen capable of performing a function of the display 120 together with the touch input function.

The storage unit 140 may be a memory device configured to store a program command and/or data required by the controller 150 while the electronic apparatus 100 operates. Data may be read/written to the storage unit 140 by a command of a central processing unit (CPU), either directly under control of the CPU or via direct memory access (DMA) set up by the CPU.

The storage unit 140 may store a program for operating the electronic apparatus 100. For example, the storage unit 140 may store the program comprising various commands required to operate the electronic apparatus 100. The storage unit 140 may be a read only memory (ROM), a hard disc drive (HDD), a solid state disc (SDD), and the like.

The storage unit 140 may store a charge application that supports a charging method according to an exemplary embodiment. The charge application may run automatically in response to the electronic apparatus 100 being coupled to an external power adapter (not shown). The power unit 200, to be described later, may charge a battery using a charging method when the charge application is executed according to an exemplary embodiment.

The controller 150 may control components in the electronic apparatus 100. For example, the controller 150 may be at least one processor and the like configured to perform an arithmetic operation. In response to a turn-on command being input to supply the power, a system may be booted according to a command stored in the ROM using an operating system (OS) stored in the storage unit 140. After booting, the controller 150 may execute code corresponding to a user command input through, for example, the display 120. The controller 150 may control outputs on the display 120.

In response to a power adapter being coupled in a wired manner or a magnetic signal being received by a power adapter that supports a wireless charging method, the controller 150 may drive the charge application, and control the battery charging operation of the power unit 200 according to a charging method supported by the charge application. For example, the charge application may determine a charging method (for example, a constant current (CC) method and a constant voltage (CV) method), a target voltage, a target current, and the like. The charge application may determine an idle period (or an idle time) during the charging process. A charging method, according to an exemplary embodiment, will be described later with reference to FIGS. 2 and 3.

The power unit 200 may supply power to the components in the electronic apparatus 100 using power provided from an external apparatus (for example, power from an external adapter) and/or the battery of the battery unit 230. For example, in response to the external adapter being coupled, the power unit 200 may provide power supplied from the external adapter to the components of the electronic apparatus 100.

If the battery needs to be charged, the power unit 200 may charge the battery. For example, the power unit 200 may determine a plurality of charging periods, determine target voltages and target currents in such a manner that the charging is performed with preset power consumption in each charging period, and charge the battery with the determined target voltages and currents. The power unit 200 may allocate an idle period between adjacent charging periods or allocate an idle period after preset charging time. The idle periods may act to reduce degradation in the lifespan of a battery due to charging. The operation of the power unit 200 will be described later with reference to FIGS. 5 to 7.

If the external adapter is not coupled, the power unit 200 may provide the power in the battery to the components in the electronic apparatus 100. The detailed configuration and operation of the power unit 200 will be described later with reference to FIG. 2.

The electronic apparatus 100 according to an exemplary embodiment described above may charge the battery by varying the target voltages and the target currents for the plurality of charging periods with the rated input power for the battery. This may reduce the charging time for the battery. While charging the battery, the electronic apparatus 100 may also allocate an idle period. The idle period may alleviate degradation in the lifespan of the battery due to charging.

An exemplary embodiment as illustrated and described in FIG. 1 shows the power unit 200 as an internal component of the electronic apparatus 100, but the power unit 200 may be implemented as an individual device separate from the electronic apparatus 100. For example, the power unit 200 may be a general portable auxiliary battery used to provide the power of the electronic apparatus.

An exemplary embodiment has illustrated and described some of the components constituting the electronic apparatus 100 in FIG. 1, but the electronic apparatus 100 may be implemented by adding various components. For example, if the electronic apparatus 100 is a TV that receives broadcast signals and displays the broadcast program, the electronic apparatus 100 may further include a tuner configured to receive the broadcast signal, a decoder configured to process the images, and the like.

Figure 2:
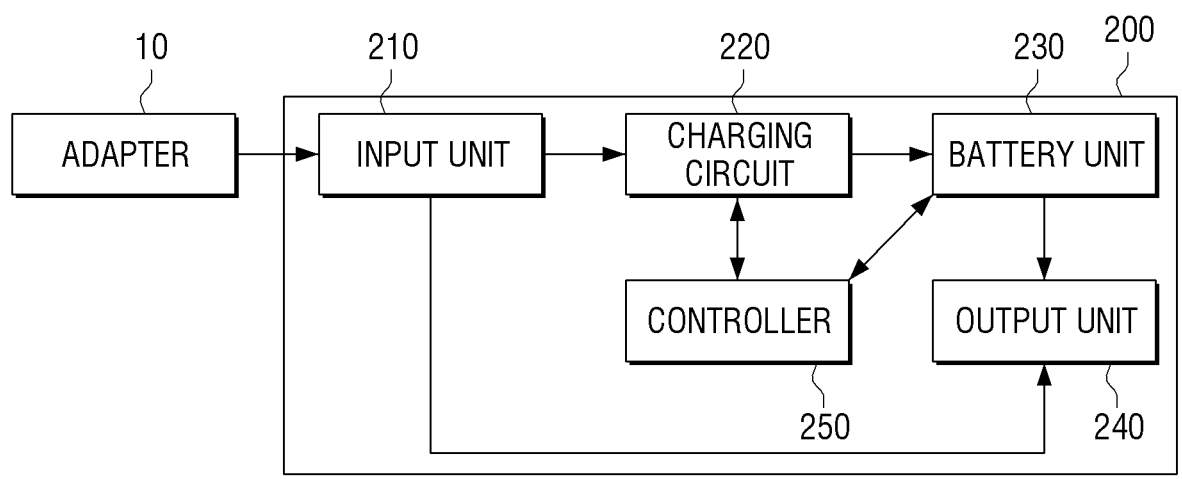
FIG. 2 is a diagram illustrating a detailed configuration of a power unit of FIG. 1.

FIG. 2 is a diagram illustrating a detailed configuration of the power unit of FIG. 1. Referring to FIG. 2, the power unit 200 may include an input unit 210, a charging circuit 220, a battery unit 230, an output unit 240, and a controller 250. For example, the power unit 200 may be implemented as one component in the electronic apparatus 100. In another example, the power unit 200 may be implemented as an individual device separate from the electronic apparatus 100. For example, the power unit 200 may be a portable battery device. In this disclosure, the power unit 200 may refer to a power supply device, a battery device, and the like.

The input unit 210 may receive direct current (DC) power from an external adapter 10. The input unit 210 may include a terminal physically coupled to the external adapter 10. An exemplary embodiment has been described where the input unit 210 receives DC power from the external adapter 10, but the input unit 210 may instead receive alternating current (AC) power. In this example, the charging circuit 220, to be described, later may include a rectifying circuit configured to convert the received AC power to DC power.

In response to the power being received from the external adapter 10, the charging circuit 220 may charge a battery of the battery unit 230 using the received power. For example, the charging circuit 220 may include a DC-DC converter (for example, a buck converter), and the like. The charging circuit 220 may convert the DC power provided from the input unit 210 to a constant charge current having a preset level through the DC-DC converter and provide the constant current to the battery according to control of the controller 250. This will be described later. The charging circuit 220 may convert the DC power provided from the input unit 210 to a constant charge voltage having a preset level and provide the constant voltage to the battery according to control of the controller 250.

The charging circuit 220 may provide constant current at a different level to the battery according to a charging period. This will be described later. The constant-current power may refer to a fixed current where the voltage may vary according to a state of the battery. The constant-voltage power may refer to a fixed voltage where the current may vary according to a state of the battery.

The battery unit 230 may include a battery that is a secondary battery, and may charge the secondary battery with the constant-current power or the constant-voltage power provided through the charging circuit 220. The battery may be, for example, a nickel battery, a cadmium battery, a nickel-cadmium battery, a nickel-hydride battery, a lithium ion battery, a lithium ion polymer battery, and the like.

The battery unit 230 may provide power to the components in the electronic apparatus 100 through the output unit

240. For example, the output unit 240 may selectively provide power input from the input unit 210 or the power of the battery unit 230 to the components in the electronic apparatus 100. In another example, the output unit 240 may simultaneously provide the power input from the input unit 210 and the power of the battery unit 230 to the components in the electronic apparatus 100.

The controller 250 may control the components in the power unit 200. For example, the controller 250 may be a processor, such as a CPU or an application-specific integrated circuit (ASIC) that executes a pre-stored program. The program may be on a local memory or an external memory.

The controller 250 may detect a charging state of the battery unit 230. For example, a charging state may be based on one or more of a battery voltage, charge capacity of the battery, and the like. The controller 250 may provide the detected charging state to the controller 150. It should be noted that the term "charging state" does not refer to a state of the battery only when it is charging, but may be the state of a battery at any time.

The controller 250 may detect whether power is input from the external adapter 10. In response to the external adapter 10 being coupled to the input unit 210, the controller 250 may determine whether to charge the battery. For example, the controller 250 may determine not to perform the charging operation if the battery voltage is larger than or equal to a preset state. If the battery voltage is less than the preset state, the controller 250 may control the charging circuit 220 to charge the battery with the power from the external adapter 10.

Upon determining that the external adapter 10 is coupled and that the battery should be charged, the controller 250 may control the charging circuit 220 in such a manner that constant currents having different levels may be provided to the battery according to the charging periods. For example, the controller 250 may determine a target voltage and a target current for a charging period according to a charging state of the battery. Accordingly, it may be that each charging period may have a different target voltage and a different target current from other charging periods.

For example, if a full charge battery voltage is 10V and a minimum battery voltage is 7V, the controller 250 may determine a plurality of charging periods with voltages (for example, 8V, 9V, and 10V) lower than the full charge voltage of 10V. The full charge battery voltage may be determined according to the kind and coupling method for the battery, but the values are merely exemplary, and may be changed. The charging period in an exemplary embodiment is divided into three periods, but the charging period may be divided into two or more periods.

The controller 250 may determine the target current corresponding to the determined target voltage. The target current may be a value determined by the determined target voltage and preset power consumption (or power input) for the battery. The target current may be determined by dividing the preset power consumption by the target voltage. For example, if the preset power consumption is 80 W and the determined target voltage is 8V, the controller 250 may determine 10 A (=80 W/8V) as the target current. If the determined target voltage is 10V, the controller 250 may determine 8 A (=80 W/10V) as the target current.

The controller 250 may control the charging circuit 220 to provide the constant current corresponding to the target voltage and the target current determined through the above-described process to the battery. For example, the controller 250 may control the charging circuit 220 to provide a first constant current to the battery until the battery voltage approaches a first target voltage. When the battery voltage is equal to the first target voltage, the controller 250 may control the charging circuit 220 to provide a second constant current smaller than the first constant current to the battery until the battery voltage is equal to a second target voltage larger than the first target voltage.

Figure 4:
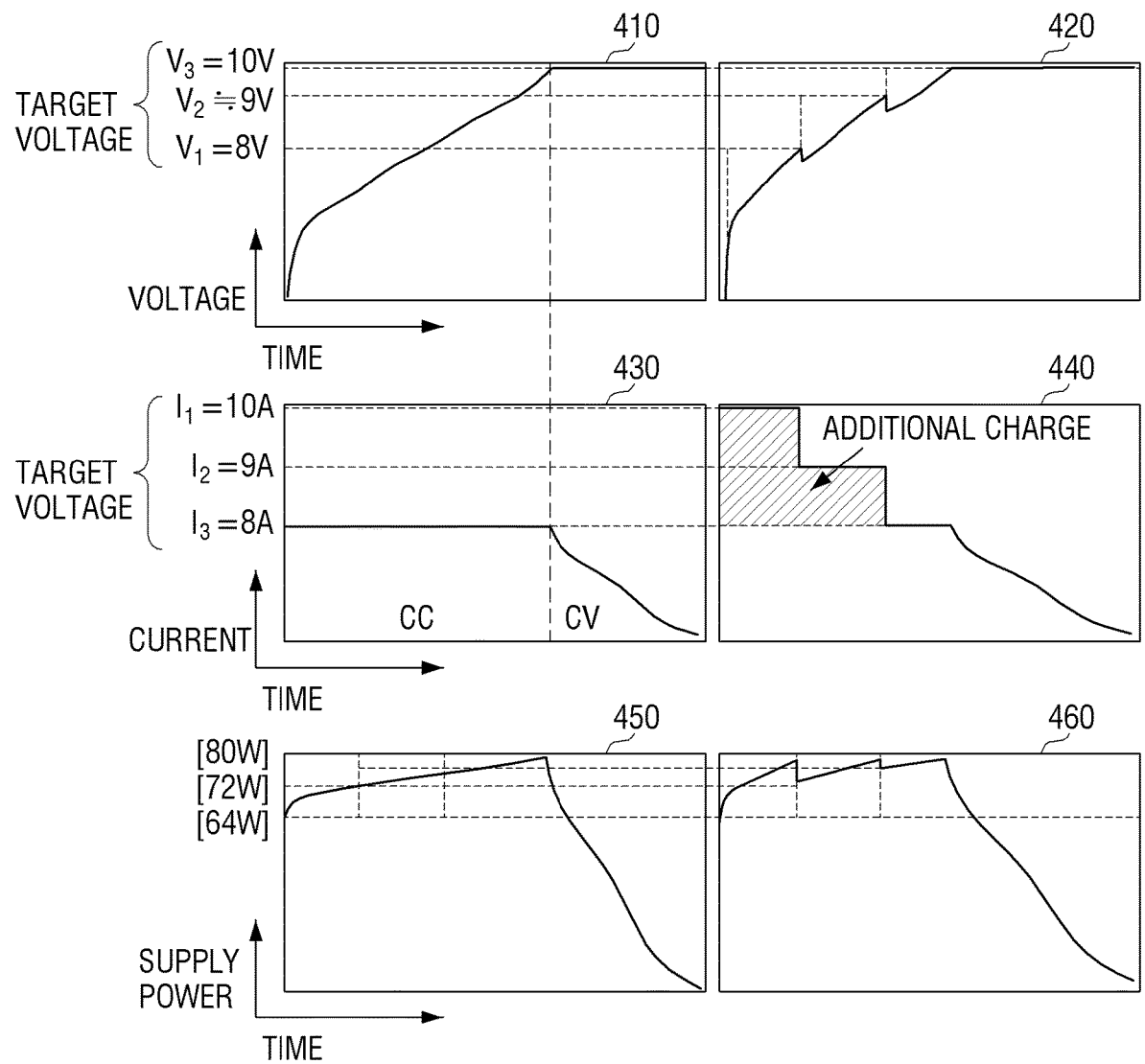
FIG. 4 is a diagram illustrating effects of a charging method according to an exemplary embodiment and a charging method in the related art.

In response to the battery voltage reaching a desired voltage by providing the different constant currents, the controller 250 may control the charging circuit 220 to provide a constant voltage to the battery. For example, the controller 250 may charge the battery in a CV manner after the CC charging, where different constant currents were provided during different charging periods, like the conventional CV charging after the CC charging, where the conventional CC charging has only one CC charging period, as shown in FIG. 4.

The controller 250 may control the charging circuit 220 to change the battery charging during idle periods of the battery charging time. For example, the controller 250 may control the charging circuit 220 to temporarily stop providing the constant current or the constant voltage during idle periods. The idle periods may be in a preset time period or between charging periods.

Or, during the idle process, the controller 250 may control the charging circuit 220 to provide a constant current smaller than the target current to the battery or control the charging circuit 220 to allow discharging current from the battery.

The controller 250 may divide the idle period into a plurality of idle sections, and control the charging circuit 220 to provide different constant currents according to the idle sections. For example, the controller 250 may control the charging circuit 220 to provide a low constant current (for example, 1 A) in a first idle section, control the charging circuit 220 to provide no current (for example, 0V) in a second idle section, and control the charging circuit 220 to provide the low constant current again in a third idle section. This combination example of the different constant currents provided in the idle sections is merely exemplary, and may be implemented in different ways other than described.

The battery may be coupled to circuit devices in the charging circuit 220 during the charging process, and thus it may be difficult to accurately measure the battery voltage when charging the battery. Accordingly, the controller 250 may measure the battery voltage in the idle period and determine the charging state of the battery based on the measured battery voltage.

In general, a measured battery voltage may be higher than an actual battery voltage during battery charging. Accordingly, when the battery voltage is measured during charging, it may be wrongly determined that the target voltage has been reached. The difference between the measured voltage and the actual battery voltage may be a factor in allowing the low constant current to be provided earlier, and thus the charging time may be increased. In an exemplary embodiment, the battery voltage may be measured in the idle period, and it is possible to more accurately measure the battery voltage.

Accordingly, an exemplary embodiment may accurately measure the battery voltage by measuring the battery voltage in the idle period, and thus the battery may be charged more rapidly.

The measurement of the battery voltage in the idle periods may not be the only times when the battery voltage is measured. That is, the battery voltage may be continuously measured during the charging process, and the battery voltage measured in an idle period may be used to verify that change of the charging method is necessary or when it is determined that accurate detection of the battery voltage is necessary.

The idle period may be a factor that increases the time required for the charging process, and thus the controller 250 may allocate the idle period to be only in a range of, for example, more than 0 seconds to less than 60 seconds. The duration time of the idle period may be determined as an experimental value according to the kind and performance of the battery. For example, the experimental value may be determined as default by a manufacturer, and the controller 250 may have previously accessed the experimental value and then use the experimental value as the idle period time. In another example, the experimental value may be acquired from the manufacturer's server through the charge application and used as the idle period time, or the experimental value may be calculated based on charge history information in the charging process.

The power unit 200 according to an exemplary embodiment may charge the battery by varying the target voltages and the target currents according to the plurality of charging periods in such a manner that the charged power is provided to the battery with the fixed power consumption, and thus the charging time of the battery may be reduced. The power unit 200 may charge the battery by allocating the idle period, and thus degradation of the lifespan of the battery due to battery charging may be alleviated.

An exemplary embodiment has illustrated and described the operation in FIG. 2 where the power unit 200 may receive the power via wire to charge the battery. However, the power unit 200 may also charge the battery in a wireless manner. An exemplary embodiment that charges the battery in a wireless charging manner will be described later with reference to FIG. 8.

Figure 3:
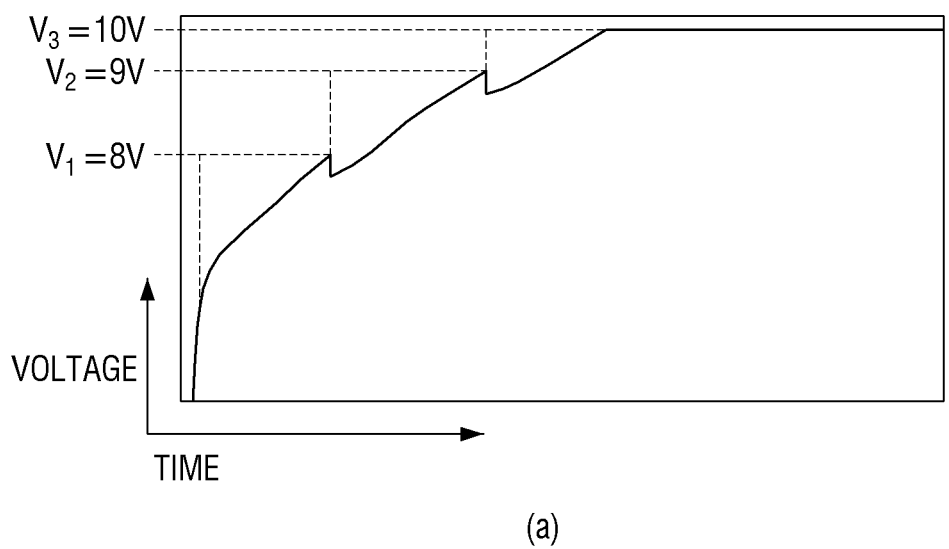
FIG. 3 shows charts illustrating a plurality of charging periods according to an exemplary embodiment.
Figure 3:
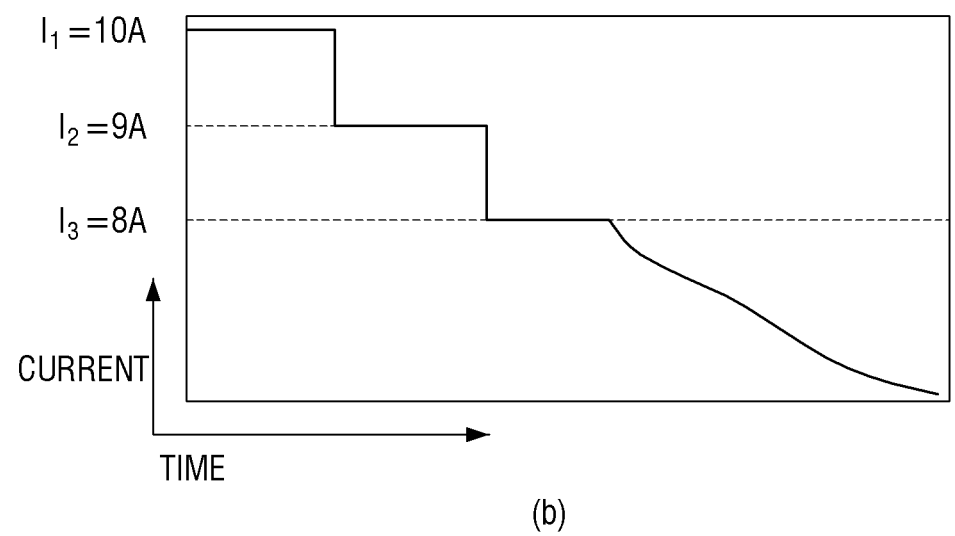

FIG. 3 shows charts illustrating a plurality of charging periods according to an exemplary embodiment. Chart (a) in FIG. 3 illustrates a voltage profile having a plurality of charging periods, and chart (b) in FIG. 3 illustrates a current profile having a plurality of charging periods. Hereinafter, the plurality of charging periods will be described on the assumption that the power consumption of a coupled adapter is 100 W and system efficiency is 80%.

Referring to charts (a) and (b) of FIG. 3, a CC charging period may be divided into three charging periods. A primary charging period may be a first charging period in which the charging is performed with a constant current of 10 A, a secondary charging period may be a second charging period in which the charging is performed with a constant current of 9 A, and a tertiary charging period may be a third charging period in which the charging is performed with a constant current of 8 A.

In response to an adapter being coupled and a voltage of a battery being detected as approximately 5V, the controller 250 may determine that charging should be performed according to the first charging period requirements. Accordingly, the controller 250 may control the charging circuit 220 to provide a constant current of 10 A to the battery until the battery voltage approaches 8V. The power consumption may be approximately 80 W (=8V*10 A) in the first charging period.

In response to an adapter being coupled and the battery voltage being detected to be larger than or equal to 8V and less than 9V, the controller 250 may perform charging according to the second charging period requirements. Accordingly, the controller 250 may control the charging circuit 220 to provide the constant current of 9 A to the battery until the battery voltage approaches the second target voltage of 9V. The power consumption may be approximately 81 W (=9V*9 A) in the second charging period.

In response to the battery voltage reaching the second target voltage of 9V and being less than 10V, the controller 250 may perform charging according to the third charging period requirements. Accordingly, the controller 250 may control the charging circuit 220 to provide the constant current of 8 A to the battery until the battery voltage approaches the third target voltage of 10V. The power consumption may be approximately 80 W (=10V*8 A) in the third charging period.

In response to the battery voltage reaching the third target voltage (or a final target voltage) of 10V, the controller 250 may control the charging circuit 220 to perform the charging in a CV manner. That is, control the charging circuit 220 to provide constant voltage to the battery.

An exemplary embodiment may charge the battery with the fixed power consumption in more periods than the method for charging the battery with one target voltage and one constant current in the related art, and thus further improve the charge rate.

Hereinafter, the charge rate according to an exemplary embodiment will be more readily described with reference to FIG. 4.

FIG. 4 is a diagram illustrating effects according to the charging method in the related art and the charging method in an exemplary embodiment. For example, in FIG. 4, the voltage profile 410, the current profile 430, and the power profile 450 show the effects of the CC and CV charging methods used in related art, and the voltage profile 420, the current profile 440, and the power profile 460 show the effects of an exemplary charging method of the present disclosure.

Referring to the voltage profile 410 and the current profile 430, the battery is charged in a single charging period with the constant current of 8 A until the battery voltage approaches the final target voltage of 10V. For example, one constant current of 8 A based on the power consumption of 80 W in the system and the final target voltage of 10V is provided until the battery voltage approaches the target voltage.

Referring to the voltage profile 420 and current profile 440 of an exemplary embodiment, the CC period is divided into three charging periods, and the battery is charged using a target voltage that is different for each charging period and a constant current that is different for each charging period. Accordingly, charging performed in the three charging periods may supply power within a preset power consumption range of 72 to 80 W.

It can be seen from the power profiles 450 and 460 that an exemplary embodiment of the present disclosure supplies more power than a charger in the related art in the first and second charging periods. Accordingly, an exemplary embodiment of the present disclosure may charge a battery more rapidly than a charger in the related art may charge the same battery. Therefore, for the same battery and the same charger, an exemplary embodiment may shorten the charge time without increasing material cost of the charger.

Constant current being continuously provided to a battery is likely to degrade the lifespan of a battery. To alleviate the degradation in the lifespan of a battery, various exemplary embodiments may allocate an idle period in the charging process. The operation will be described later with reference to FIGS. 5 to 7.

Figure 5:
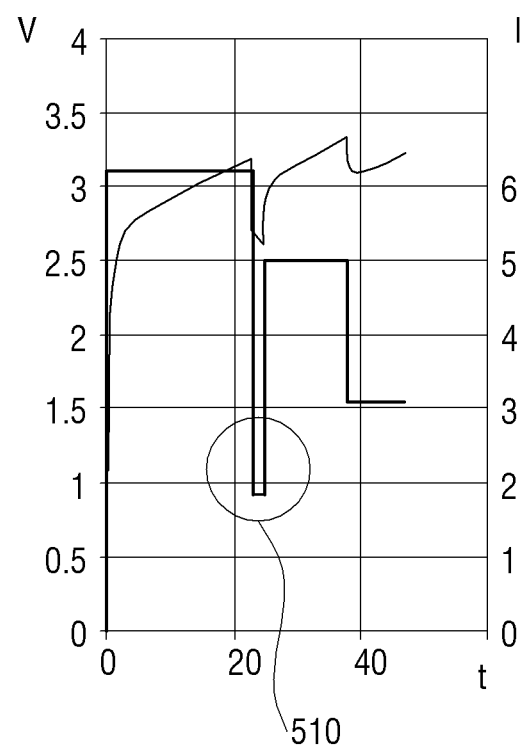
FIG. 5 is a diagram illustrating an operation in an idle period according to an exemplary embodiment.

FIG. 5 is a diagram illustrating the operation in an idle period according to an exemplary embodiment. Referring to FIG. 5, two charging periods and one idle period are illustrated. For example, FIG. 5 illustrates a first charging period in which a constant current of 6 A is provided to a battery, a second charging period in which a constant current of 5 A is provided to the battery, and an idle period between the first and second charging periods. An embodiment may provide a constant current lower than the constant current of the charging period before the idle period may be provided in the idle period. In different embodiments, no current may be provided in the idle period or the battery may discharge current in an idle period.

An exemplary embodiment has illustrated that a constant current of approximately 1 A smaller than a constant current used in the CC charging is provided in the idle period, but it may be implemented such that the constant current is stopped. In another example, it may be implemented that a reverse current, that is, the discharge current is provided. The example of providing the discharge current will be described below with reference to FIG. 6.

The idle period may be a factor that alleviates the reduction in the lifespan of the battery, but the idle period may also be a factor that increases the charging time of the battery. Accordingly, the idle period may be implemented to be, for example, more than zero (0) seconds and less than 60 seconds to alleviate the reduction in the lifespan of the battery.

An exemplary embodiment has described that the idle period is arranged only between adjacent charging periods among the plurality of charging periods, but the idle period may be arranged in one charging period. In another example, the idle period may be arranged in the CC charging period or the CV charging period.

Figure 6:
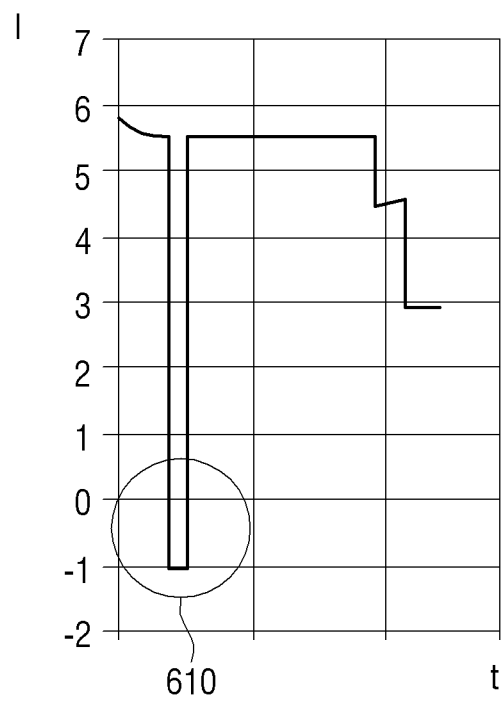
FIG. 6 is a diagram illustrating an operation in an idle period according to another exemplary embodiment.

FIG. 6 is a diagram illustrating an operation in the idle period according to another exemplary embodiment. Referring to FIG. 6, an idle period is arranged in a first charging period with one constant current of approximately 5.5 A. In this embodiment, a constant current of −1 A may be provided to a battery in the idle period. That is, the battery may output a constant current of 1 A.

Figure 7:
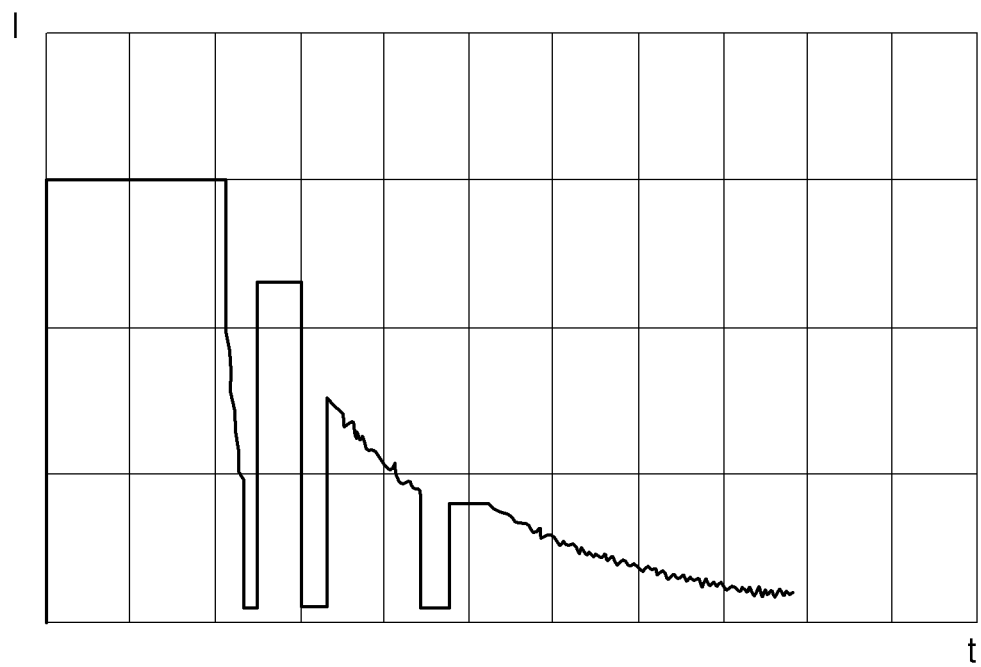
FIG. 7 is a diagram illustrating a relationship between a plurality of charging periods and an idle period according to an exemplary embodiment.

FIG. 7 is a diagram illustrating a relationship between a plurality of charging periods and an idle period. Referring to FIG. 7, two CC charging periods, one CV charging period, and three idle periods are illustrated.

A first charging period may be a period when the battery is charged with a first constant current, and a second charging period may be a period when the battery is charged with a second constant current smaller than the first constant current. A third charging period may be a period when the battery is charged with a constant voltage after the voltage of the battery approaches a target voltage.

The three idle periods may be a first idle period between the first charging period and the second charging period, a second idle period between the second charging period and a third charging period, and a third idle period in the third charging period. Voltage measurement of the battery may be performed in the idle periods.

An exemplary embodiment may allocate the idle period between the charging periods or in the charging period, and thus may minimize degradation in the lifespan due to charging of the battery.

An exemplary embodiment illustrates in FIG. 7 that the idle operation is performed in the same manner in the idle periods, but various embodiments of the disclosure need not be so limited. For example, the idle operation in which a constant current of 1 A is provided may be performed between the first charging period and the second charging period, and the idle operation in which no constant current is provided may be performed in the second charging period and the CV charging period.

An exemplary embodiment has illustrated and described in FIGS. 5 to 7 that the idle period has one current state, but various embodiments of the disclosure need not be so limited. For example, an idle period may be divided into a plurality of idle sections, and the idle operations of different current states may be performed in these idle sections. For example, a first idle section may have a constant current of 1 A, a second idle section may have no current, a third idle section may discharge current from the battery, and the like, may be combined in one idle period. The same idle period operation need not be applied to all the idle periods, but an idle period operation may be different according to the charging method for the battery.

Figure 8:
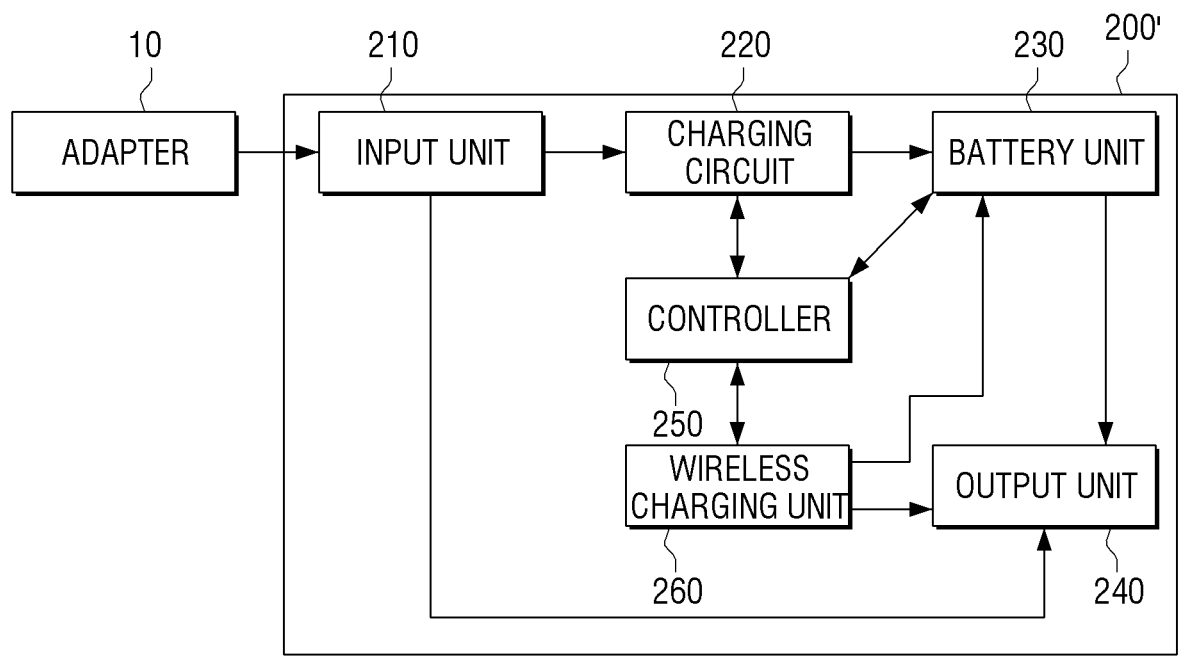
FIG. 8 is a diagram illustrating a detailed configuration of a power unit according to another exemplary embodiment.

FIG. 8 is a diagram illustrating a detailed configuration of a power unit according to another exemplary embodiment. Referring to FIG. 8, a power unit 200' may include an input unit 210, a charging circuit 220, a battery unit 230, an output unit 240, a controller 250, and a wireless charging unit 260.

Configurations and functions of the input unit 210, the charging circuit 220, the battery unit 230, and the output unit 240 are the same as those in the power unit 200 of FIG. 2, and thus overlapping description will be omitted.

The wireless charging unit 260 may receive magnetic energy from an external adapter 10, and convert the received magnetic energy to power having a preset level. The wireless charging unit 260 may support, for example, a magnetic induction type wireless charging method and/or a magnetic resonance type wireless charging method. The wireless charging unit 260 may convert the magnetic energy transferred from the external adapter 10 according to the above-described method to electrical energy.

The wireless charging unit 260 may convert the converted electrical energy to a constant current or constant voltage power corresponding to a charging period using a DC-DC converter and provide the converted constant current or constant voltage power to the battery unit 230.

In response to the reception of the electrical energy through the wireless charging unit 260 being detected, the controller 250 may detect a charging state of the battery unit 230, and determine whether wireless charging is necessary. If it is determined that the wireless charging is not necessary, the controller 250 may control the wireless charging unit 260 to interrupt the transmission of the magnetic energy. This may be done, for example, by communicating to the wireless power transmitter to stop transmitting power.

If it is determined to perform wireless charging, the controller 250 may control the wireless charging unit 260 to generate a constant current or a constant voltage power corresponding to a current charging period as described above.

The power unit 200' according to an exemplary embodiment may charge the battery by varying the target voltages and the target currents suitable for each of the plurality of charging periods even with power provided in the wireless manner, and thus the charging time of the battery may be reduced.

An exemplary embodiment has illustrated in FIG. 2 that the power unit 200 receives power in the wired manner, but a similar power unit 200' shown in FIG. 8 may be implemented to receive the external power in the wireless charging manner using the added wireless charging unit 260. Accordingly, the power unit 200' may receive wired power via a wired connection using the input unit 210 and the charging unit 220, or use receive wireless power using the wireless charging unit 260. For a wireless only charging capability, the input unit 210 and the charging circuit 220 may be removed.

Figure 9:
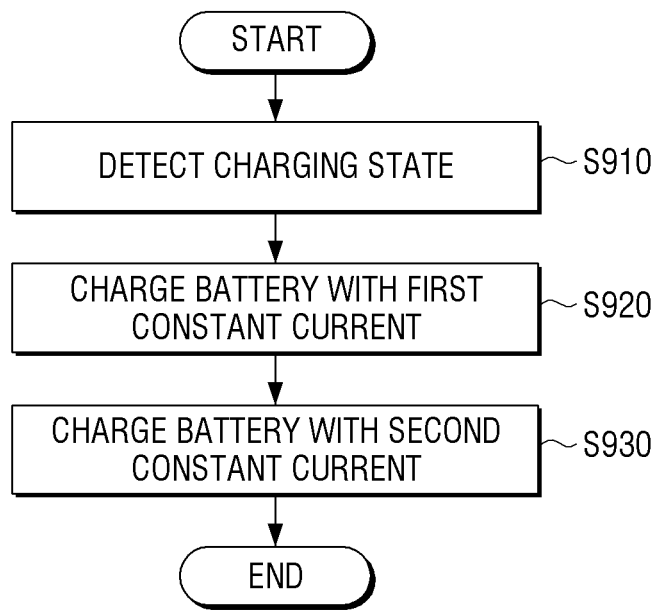
FIG. 9 is a flowchart illustrating a charge controlling method according to an exemplary embodiment.

FIG. 9 is a flowchart illustrating a charge controlling method according to an exemplary embodiment. Referring to FIG. 9, a charging state of a battery may be detected (S910). For example, a voltage level, a charge rate, and the like, of the battery may be detected. The voltage measurement of the battery may be performed, for example, in an idle period.

The charging process may provide for a plurality of charging periods depending on the detected charging state, and the battery may be charged to a target voltage for each of the charging periods with a constant target current determined by the target voltage for the charging period and preset power consumption. For example, a first constant current may be provided to the battery until a battery voltage approaches a first target voltage corresponding to the charging state (S920).

In response to the first target voltage being achieved, a second constant current smaller than the first constant current may be provided to the battery until the battery voltage approaches a second target voltage larger than the first target voltage (S930).

If the second target voltage is a final target voltage, that is, if the second target voltage is the final desired battery voltage, the battery may be charged in a CV manner until, for example, the current to the battery goes below a threshold.

The charge controlling method according to an exemplary embodiment may charge the battery by varying the target voltages and the target currents as determined for the plurality of charging periods in such a manner that the charge power may be provided to the battery substantially meeting the requirement for power consumption of the battery, and thus the charging time of the battery may be reduced. The charge controlling method may charge the battery by allocating an idle period, and thus the degradation in the lifespan of the battery due to the battery charging may be alleviated. The charge controlling method of FIG. 9 may be executed on the electronic apparatus having the configuration of FIG. 1 or the power unit having the configuration of FIG. 2 or FIG. 8. The charge controlling method of FIG. 9 may also be executed on electronic apparatuses or power apparatuses having other configurations.

The charge controlling method described above may be implemented with a program (or application) executable by a computer, and the program may be stored in a non-transitory computer-readable medium. The non-transitory computer-recordable medium is not a medium configured to temporarily store data such as a register, a cache, or a memory but an apparatus-readable medium configured to permanently or semi-permanently store data. For example, the above-described applications or programs may be stored in the non-transitory apparatus-readable medium such as a compact disc (CD), a digital versatile disc (DVD), a hard disc, a Blu-ray disc, a universal serial bus (USB), a memory card, or a ROM and provided.

Figure 10:
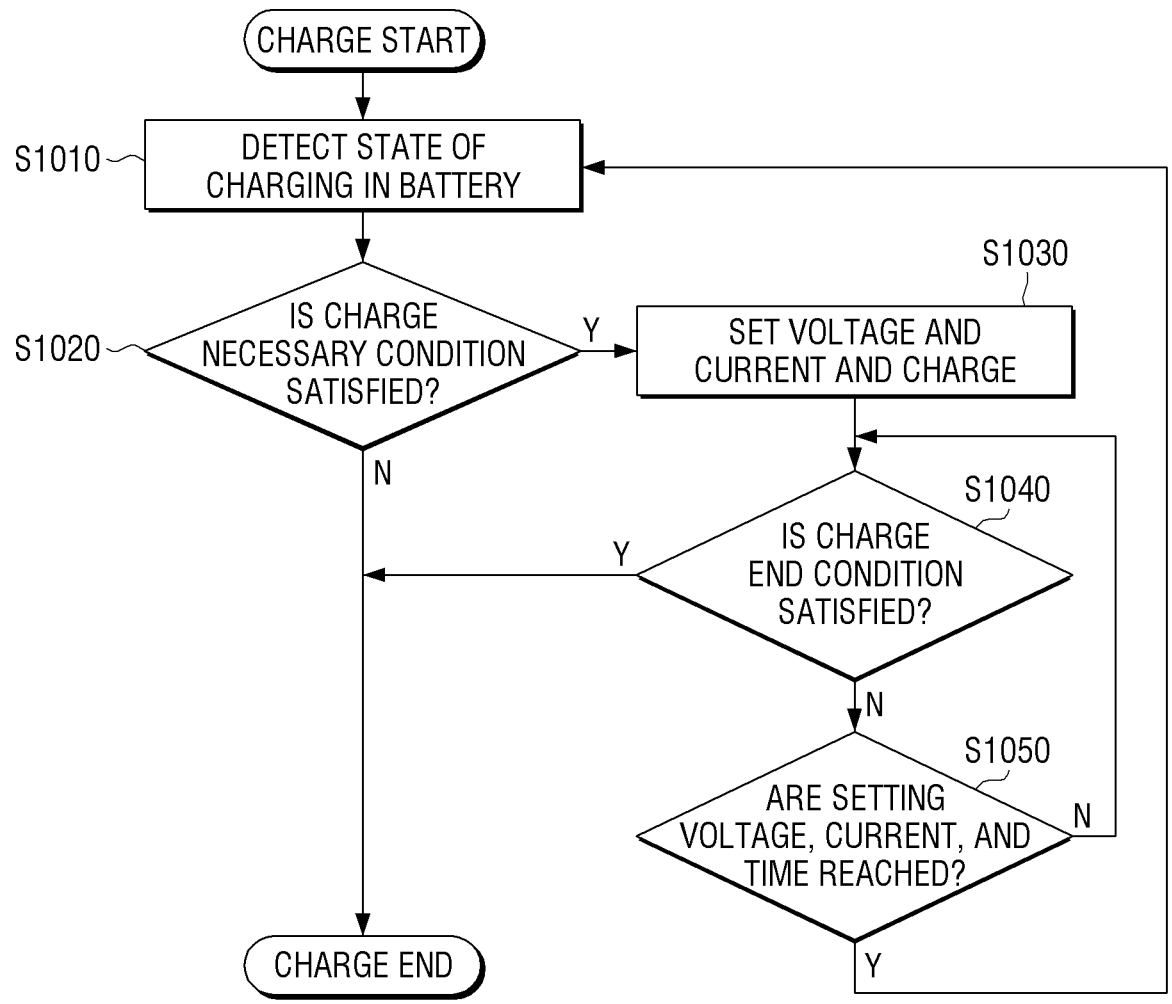
FIG. 10 is a flowchart illustrating a battery charging method only using a wired charging manner according to an exemplary embodiment.

FIG. 10 is a flowchart illustrating a battery charging method only using a wired charging manner according to an exemplary embodiment. Referring to FIG. 10, a charging state of a battery may be detected (S1010). For example, the battery voltage, charging degree of the battery, and the like may be detected.

It may be determined whether to charge the battery according to the charging state in the battery (S1020). In the battery does not need to be charged (S1020-N), then the charging process is finished.

If it is determined that charging is necessary (S1020-Y), a charging period corresponding to the detected charging state may be determined, as well as a charging method, a target voltage, and a target current corresponding to the charging period, and a charging operation may be performed according to the determined charging method, the target voltage, and the target current (S1030).

There may be one or more voltage measurements to determine whether the battery charging end condition is met—for example, the target voltage, target current, or a preset time has reached its appropriate final target number during the charging process (S1040). If the charging end condition is met (S1040-Y), the charging is finished.

If the charging end condition is not satisfied (S1040-N), the process may proceed to operation S1050. If the target voltage, target current, or the preset time has not been reached, the charging may continue (S1050-N) by continuing the charge operation (S1040). If the target voltage, the target current, or the preset time has been reached (S1050-Y), the process may return to the proceeding operations to detect the battery state (S1010) and the above-described process may be repeated with appropriate setting for the new charging period.

The charge controlling method according to an exemplary embodiment may charge the battery by setting the target voltages and the target currents for each of the plurality of charging periods in such a manner that maximum charge power may be provided to the battery substantially within the fixed power consumption requirement, and thus the charging time of the battery may be reduced. The charge controlling method may charge the battery by allocating an idle period, and thus the degradation in the lifespan of the battery due to the battery charging may be alleviated. The charge controlling method of FIG. 10 may be executed on the electronic apparatus having the configuration of FIG. 1 or the power unit having the configuration of FIG. 2 or FIG. 8. The charge controlling method of FIG. 10 may be executed on electronic apparatuses or power apparatuses having other configurations.

The charge controlling method described above may be implemented in a program (or application) including an algorithm executable in a computer, and the program may be stored in a non-transitory computer-readable medium.

Figure 11:
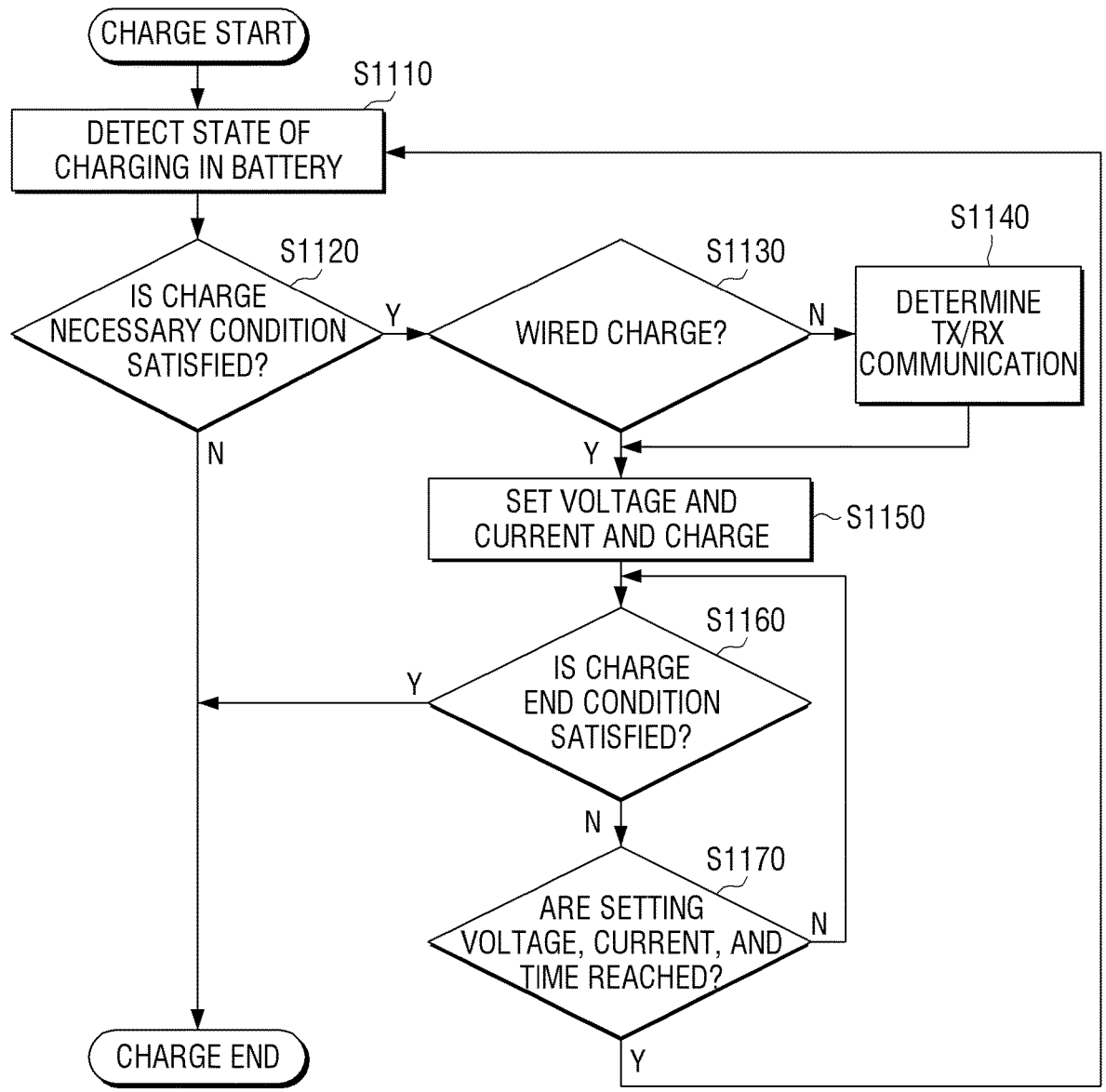
FIG. 11 is a flowchart illustrating a battery charging method using wired and wireless charging manners according to an exemplary embodiment.

FIG. 11 is a flowchart illustrating a battery charging method capable of employing both wired and wireless charging methods according to an exemplary embodiment. Referring to FIG. 11, a charging state in a battery may be detected (S1110). For example, the battery voltage, charging degree of the battery, and the like may be detected.

It may be determined whether to charge the battery according to the charging state in the battery (S1120). If the battery does not need to be charged (S1120-N), then the charging process is finished.

If the battery does need to be charged (S1120-Y), it may be determined whether to use wired power or wireless power (S1130). For example, it may be determined whether to use the wired power or the wireless power by detecting whether magnetic energy is receivable from an external adapter or whether an adapter power is input through an input unit.

If wireless power is to be used for charging rather than wired power (S1130-N), the transmission of the magnetic energy may be requested from a wireless power transmitter so that the wireless charging unit receives the magnetic energy (S1140). Upon completing a connection setup for the reception of the magnetic energy, the next operation may be at S1150. If wired power is to be used for charging rather than wireless power (S1130-Y), the next operation may be at S1150. A charging period corresponding to the detected charging state may be determined, a charging method, a target voltage, and a target current corresponding to the determined charging period may be determined, and a charging operation may be performed according to the determined charging method, target voltage, and target current (S1150).

There may be one or more voltage measurements to determine whether the battery charging end condition is met—for example, the target voltage, target current, or a preset time has reached its appropriate final target number during the charging process (S1160). If the charging end condition is met (S1160-Y), the charging is finished.

If the charging end condition is not satisfied (S1160-N), the process may proceed to operation S1170. If the target voltage, target current, or the preset time for an idle period has not been reached, the charging may continue (S1170-N) by continuing the charge operation at operation S1160. If the target voltage, the target current, or the preset time has been reached (S1170-Y), the process may return to the proceeding operations to detect the battery state (S1110) and the above-described process may be repeated with appropriate setting for the new charging period.

The charge controlling method according to an exemplary embodiment may charge the battery by setting the target voltage and/or the target current for each of the plurality of charging periods in such a manner that the charge power may be provided to the battery substantially within the fixed power consumption requirement for the battery, and thus the charging time of the battery may be reduced. The charge controlling method may also support the wires charging method, and thus the user convenience may be improved. The charge controlling method of FIG. 11 may be executed on an electronic apparatus having the configuration of FIG. 1 or the power unit having the configuration of FIG. 8. The charge controlling method of FIG. 11 may also be executed on electronic apparatuses or power apparatuses having other configurations.

The charge controlling method described above may be implemented in a program (or application) including an algorithm executable in a computer, and the program may be stored in a non-transitory computer-readable medium.

The foregoing exemplary embodiments and advantages are merely exemplary and are not to be construed as limiting the present disclosure. The present teaching can be readily applied to other types of apparatuses. Also, the description of exemplary embodiments of the present disclosure is intended to be illustrative, and not to limit the scope of the claims, and many alternatives, modifications, and variations will be apparent to those skilled in the art due to the descriptions of the present disclosure.

What is claimed is:

1. An electronic apparatus comprising:
   a battery;
   a charging circuit configured to charge the battery using power received from an external power source; and
   a controller configured to:
      control the charging circuit to charge the battery with a first current until a voltage of the battery becomes equal to a first target voltage, and
      when the voltage of the battery is equal to or higher than the first target voltage, control the charging circuit to charge the battery with a second current lower than the first current until the voltage of the battery becomes equal to a second target voltage greater than the first target voltage,
   wherein the controller measures the voltage of the battery during an idle period in which the first current or the second current is temporarily not provided.

2. The electronic apparatus as claimed in claim 1, wherein the controller is further configured to control the charging circuit to charge the battery with a constant voltage corresponding to the second target voltage based on the voltage of the battery becoming equal to the second target voltage.

3. The electronic apparatus as claimed in claim 1, wherein the controller controls the charging circuit to charge the battery with a third current or to receive a discharge current from the battery in the idle period provided between a period during which the battery is charged with the first current and a period during which the battery is charged with the second current, and
   the third current is smaller than the first current or the second current.

4. The electronic apparatus as claimed in claim 3, wherein the third current comprises current of different levels, and
   the idle period includes a plurality of idle sections in which the battery is charged with the current of different levels, respectively.

5. The electronic apparatus as claimed in claim 3, wherein the idle period is more than 0 seconds and less than 60 seconds.

6. The electronic apparatus as claimed in claim 1, further comprising a wireless charging unit configured to receive the power wirelessly from the external power source and charge the battery by converting the received power to a power having at least one of first current or the second current of a preset level, respectively, under a control of the controller.

7. A charge controlling method of an electronic apparatus including a battery, the charge controlling method comprising:
   receiving a power from an external power source;
   charging the battery with a first current until a voltage of the battery becomes equal to a first target voltage; and
   when the voltage of the battery is equal to or higher than the first target voltage, charging the battery with a second current lower than the first current until the voltage of the battery becomes equal to a second target voltage greater than the first target voltage,
   wherein the charge controlling method further comprises:
   measuring the voltage of the battery during an idle period in which the first current or the second current is temporarily not provided.

8. The charge controlling method as claimed in claim 7, further comprising charging the battery with a constant voltage corresponding to the second target voltage based on the voltage of the battery becoming equal to the second target voltage.

9. The charge controlling method as claimed in claim 7, further comprising charging the battery with a third current or receiving a discharge current from the battery in the idle period provided between a period during which the battery is charged with the first current and a period during which the battery is charged with the second current,
   wherein the third current is smaller than the first current or the second current.

10. The charge controlling method as claimed in claim 9, wherein the third current comprises current of different levels, and the idle period includes a plurality of idle sections in which the battery is charged with the current of different levels, respectively.

11. The charge controlling method as claimed in claim 9, wherein the idle period is more than 0 seconds and less than 60 seconds.

12. The charge controlling method as claimed in claim 7, further comprising:
   receiving the power wirelessly from the external power source; and
   converting the received power to a power having at least one of the first current or the second current of a preset level, respectively.

13. A non-transitory computer-readable recording medium including a program for executing a charge controlling method of an electronic apparatus including a battery, the charge controlling method comprising:
   receiving a power from an external power source;
      charging the battery with a first current until a voltage of the battery becomes equal to a first target voltage; and
   when the voltage of the battery is equal to or higher than the first target voltage, charging the battery with a second current lower than the first current until the voltage of the battery becomes equal to a second target voltage greater than the first target voltage,
   wherein the charge controlling method further comprises:
   measuring the voltage of the battery during an idle period in which the first current or the second current is temporarily not provided.

14. The non-transitory computer-readable recording medium as claimed in claim 13, further comprising charging the battery with a third current or receiving a discharge current from the battery in the idle period between a period during which the battery is charged with the first current and a period during which the battery is charged with the second current,
   wherein the third current is smaller than the first current or the second current.

15. The electronic apparatus as claimed in claim 1, wherein the controller is further configured to charge the battery within a preset power consumption by determining the first current as a quotient of the preset power consumption and the first target voltage and determining the second current as a quotient of the preset power consumption and the second target voltage.

16. The electronic apparatus as claimed in claim 3, wherein the controller is further configured to control the charging circuit to charge the battery with the third current smaller than the first current in the idle period provided in the period during which the battery is charged with the first current, and control the charging circuit to charge the battery with the third current smaller than the second current in the idle period between the period during which the battery is charged with the first current and a stop of the period during which the battery is charged with the second current.

* * * * *